June 12, 1956   L. W. WIGHTMAN   2,750,521
DYNAMOELECTRIC MACHINE ROTOR MEMBER
Filed March 27, 1953
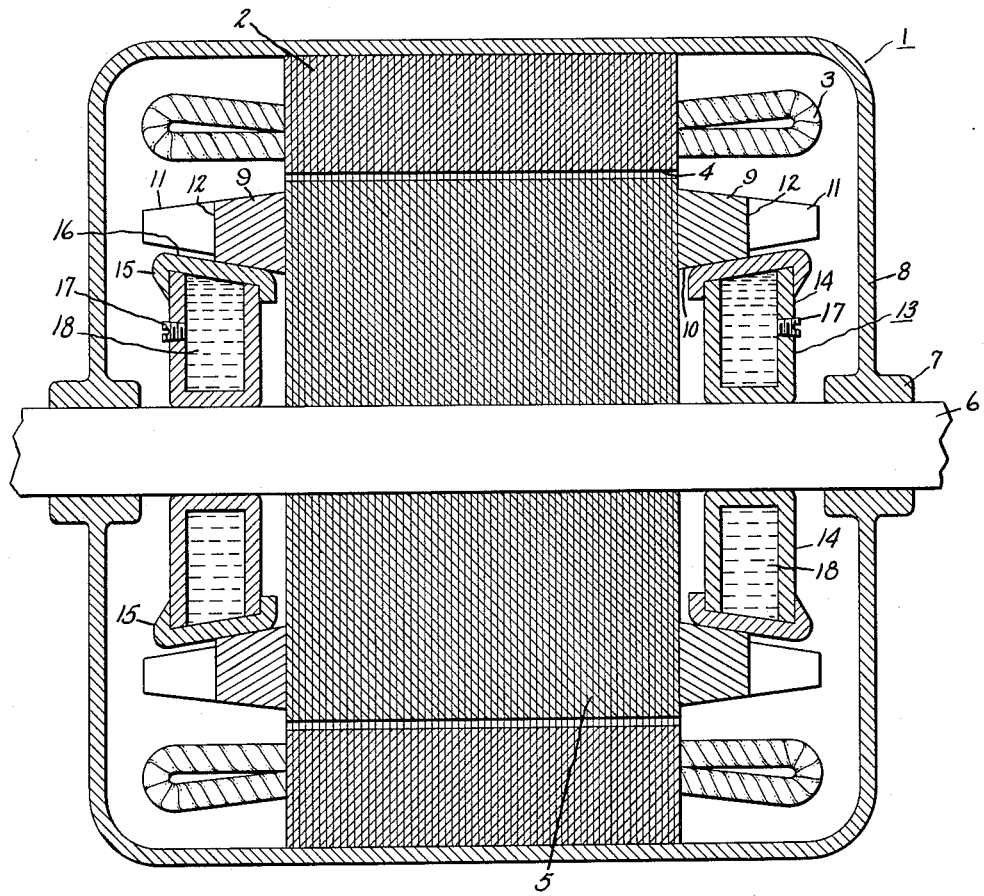
Inventor:
Lawrance W. Wightman,
by Robert G. [signature]
His Attorney.

United States Patent Office 2,750,521
Patented June 12, 1956

2,750,521

DYNAMOELECTRIC MACHINE ROTOR MEMBER

Lawrance W. Wightman, Fort Wayne, Ind., assignor to General Electric Company, a corporation of New York Application March 27, 1953, Serial No. 344,941

8 Claims. (Cl. 310—54)

This invention relates to dynamoelectric machines and more particularly to the rotor members thereof.

A major limitation in the design of certain small dynamoelectric machines, for example 400 cycle induction motors for aircraft application, is the heat absorption ability per unit of temperature rise of the rotor. In most standard forms of high frequency induction motor rotor construction, the end rings are the limiting factor since the heat generated in the rotor causes the temperature in the end rings to rise faster than the temperature of any other part. During the stalled or high inertia starting conditions, the end rings may melt before the stator winding has reached a temperature at which an overload device will operate and thus the performance of the motor is greatly limited.

Because of this limitation, the present design practice in this type of machine is to fabricate the rotor bars and end rings of copper which will withstand a higher temperature than materials used in conventional duty machines, for example aluminum. The more readily castable materials, such as aluminum, are more desirable however, since they provide a larger surface contact between the bars and the rotor iron and facilitate the casting operation. The present disadvantage of these materials is their lower melting temperature.

It is desirable, therefore, to provide an induction motor rotor construction incorporating means for cooling the end rings thereby permitting the substitution of material such as aluminum for the copper previously used and further permitting the machine to be designed for a higher output.

It is further desirable that the means provided for cooling the end rings absorb the heat therefrom with the lowest rate of temperature increase. Water is the best agent which is readily available for this purpose and it is, therefore, preferable that water be used as the heat absorbing medium.

An object of this invention is, therefore, to provide an improved dynamoelectric machine rotor construction incorporating means for cooling the portions of the winding extending outside of the rotor.

Another object of this invention is to provide an improved dynamoelectric machine rotor construction incorporating means for water cooling the portions of the winding extending outside of the rotor.

Further objects and advantages of this invention will become more readily apparent and the invention will be better understood by reference to the following description and the accompanying drawing, and the features of novelty which characterize this invention will be pointed out with particularity in the claims annexed to and forming a part of this specification.

In accordance with this invention, a rotor member is provided having a winding formed thereon, such as a squirrel cage winding for an induction motor, with a portion extending outwardly on at least one end of the rotor, such as an end ring. A chamber is provided adjacent the winding extension portion and adapted to contain a heat absorbing liquid, such as water, to thereby extract heat from the winding extension portion. More specifically, the rotor member is mounted on a shaft and is provided with a squirrel cage winding with an end ring on one end of the rotor having fan blades formed on its outer edge and having a tapered inner surface. The chamber member has an annular configuration and is mounted on the shaft on the exterior of the rotor within the end ring and in contact therewith. This chamber member preferably has an annular body portion positioned on the shaft with a U-shaped cross section, and an annular cover member engaging the legs of the body portion and with its outer peripheral surface engaging the inner surface of the end ring. The chamber member preferably extends outwardly under the end rings. Means are provided for filling the chamber with a heat absorbing liquid, preferably water.

The single figure of the drawing is a side elevational view, partly in section, illustrating the improved induction motor rotor construction of this invention.

Referring now to the drawing, there is shown a dynamoelectric machine generally identified as 1, such as a small intermittent duty 400 cycle induction motor for aircraft application. The dynamoelectric machine 1 is provided with an outer stator member 2 of any conventional form, in which suitable field windings 3 are arranged. Stator member 2, which is formed of a plurality of relatively thin laminations of magnetic material, defines a bore 4 within which rotor member 5 is positioned. Rotor member 5, also formed of a plurality of relatively thin laminations of magnetic material, is mounted on shaft 6 which in turn is rotatably supported by bearings 7. The bearings 7 are mounted in outer casing member 8 which also supports stator member 2.

A suitable winding (not shown), such as a squirrel cage winding formed of cast aluminum, is arranged in slots (not shown) in the outer periphery of rotor member 5 and terminates in end rings 9. The annular end rings 9 preferably have their inner peripheral surfaces 10 tapered outwardly, and a plurality of fan blades 11 are formed on their outer edges 12.

In order to cool end rings 9 thus permitting the machine 1 to be operated at higher intermittent ratings, annular chamber members 13 are provided mounted on shaft 6 on the exterior of rotor 5 within end rings 9 and fan blades 11. Each of the chamber members 13 includes an annular body portion 14 mounted on shaft 6 and having a substantially U-shaped cross section, and an annular cover member 15 engaging the legs of the body portion 14, thus completing the enclosure, and having its outer peripheral surface 16 engaging the tapered inner surface 10 of its associated end ring 9. As will be readily seen in the drawing, chamber members 13 extend axially outwardly beyond the end rings 9 and under the fan blades 11. The outer wall of the body portion 14 of each chamber member 13 is provided with a suitable filling opening, closed with a suitable plug 17, to provide for filling the chamber members with a suitable heat absorbing liquid 18, such as water.

The chamber members 13 are preferably formed of corrosion resistant material, such as stainless ssteel, the inner body portions 14 being pressed onto the shaft 6. The cover members 15 are preferably spun over the body portions 14 and respectively brazed in place. It will be readily apparent that the heat extracted by the heat absorbing liquid 18 from the end rings 9 may cause the liquid to boil and thus the chambers 13 must be designed to withstand the resultant vapor pressure.

It will be readily apparent that the heat in the end rings 9 will travel across the pressed taper fit between the inner tapered surfaces 10 and the outer annular cover members 16 of chambers 13 into the heat absorbing liquid 18, where it will be absorbed at a very low rate of temperature rise. The provision of chambers 13 will thus prevent end rings 9 from melting during very high rotor current conditions of short duration, such as starting of the motor with a high inertia load.

It will now be readily apparent that this invention provides an improved rotor construction which not only permits the use of more desirable materials for the squirrel cage bars and end rings, but also permits the machine to be operated at higher intermittent ratings.

While I have shown and described a particular embodiment of this invention, further modifications and improvements will occur to those skilled in the art. I desire that it be understood therefore that this invention is not limited to the form shown and I intend in the appended claims to cover all modifications which do not depart from the spirit and scope of this invention.

What I claim as new and desire to secure by Letters Patent of the United States is:

1. In a dynamoelectric machine, a rotor member having a winding formed thereon, said winding having a portion extending beyond one end of said rotor member, and an enclosed annular chamber member positioned on the exterior of said rotor member within said winding extension portion and in contact therewith, said chamber member being adapted to contain a heat absorbing liquid thereby extracting heat from said winding extension portion.

2. In a dynamoelectric machine, a rotor member mounted on a shaft and having a winding formed thereon, said winding having a portion extending beyond one end of said rotor member, an annular chamber member mounted on said shaft on the exterior of said rotor member, said chamber member having an annular body portion of substantially U-shaped cross section and an annular cover portion engaging the legs of said body portion thereby completing the enclosure, the outer peripheral surface of said cover portion engaging the inner surface of said winding extension portion, and means for filling said chamber with a heat absorbing liquid for extracting heat from said winding extension portion.

3. In a dynamoelectric machine, a rotor member having a squirrel cage winding formed thereon, said winding including an end ring formed on one end of said rotor member, and a chamber member positioned on the exterior of said rotor member in contact with said end ring, said chamber being adapted to contain a heat absorbing liquid thereby extracting heat from said end ring.

4. In a dynamoelectric machine, a rotor member having a squirrel cage winding formed thereon, said winding including an end ring formed at one end of said rotor member, and an annular chamber member positioned on the exterior of said rotor member within said end ring and in contact therewith, said chamber member being adapted to contain a heat absorbing liquid thereby extracting heat from said end ring.

5. In a dynamoelectric machine, a rotor member having a squirrel cage winding formed thereon, said winding including an end ring formed at one end of said rotor member, said end ring having a plurality of fan blades formed on its outer edge, and an annular chamber member positioned on the exterior of said rotor member within said end ring and in contact with the inner surface thereof, said chamber member extending axially outwardly under said fan blades, said chamber member being adapted to contain a heat absorbing liquid thereby extracting heat from said end ring.

6. In a dynamoelectric machine, a rotor member mounted on a shaft and having a squirrel cage winding formed thereon, said winding including an end ring formed on one end of said rotor member, an annular chamber member mounted on said shaft on the exterior of said rotor member, said chamber member having an annular body portion of substantially U-shaped cross section and an annular cover portion engaging the legs of said body portion thereby completing the enclosure, the outer peripheral surface of said cover portion engaging the inner surface of said end ring, and means for filling said chamber member with a heat absorbing liquid for extracting heat from said end ring.

7. In a dynamoelectric machine, a rotor member mounted on a shaft and having a squirrel cage winding formed thereon, said winding including an end ring formed on one end of said rotor member, said end ring having a plurality of fan blades formed on its outer edge, an annular chamber member mounted on said shaft on the exterior of said rotor member and within said end ring, said chamber member having an annular body portion of substantially U-shaped cross section and an annular cover portion engaging the legs of said body portion thereby completing the enclosure, the outer peripheral surface of said cover portion engaging the inner surface of said end ring, said chamber member extending axially outwardly under said fan blades, and means for filling said chamber member with a heat absorbing liquid for extracting heat from said end ring.

8. In a dynamoelectric machine, a rotor member mounted on a shaft and having a squirrel cage winding formed thereon, said winding including an end ring formed on one end of said rotor member, said end ring having an outwardly tapered inner surface and a plurality of fan blades formed on its outer edge, an annular chamber member mounted on said shaft on the exterior of said rotor member and within said end ring and fan blades, said chamber member having an annular body portion of substantially U-shaped cross section and an annular cover portion engaging the legs of said body portion thereby completing the enclosure, the outer peripheral surface of said cover portion engaging said end ring inner surface, and means for filling said chamber member with a heat absorbing liquid for extracting heat from said end ring.

References Cited in the file of this patent

UNITED STATES PATENTS

| 686,856 | Langdon-Davies et al. | Nov. 19, 1901 |
| 2,295,404 | Johns | Sept. 8, 1942 |
| 2,310,470 | Soldner | Feb. 9, 1943 |

FOREIGN PATENTS

| 170,946 | Great Britain | Oct. 31, 1921 |
| 500,984 | France | Jan. 13, 1920 |